(12) United States Patent
Kamei

(10) Patent No.: US 9,085,865 B2
(45) Date of Patent: Jul. 21, 2015

(54) WAVE DISSIPATING DEVICE

(71) Applicant: Kaichiro Kamei, Mie (JP)

(72) Inventor: Kaichiro Kamei, Mie (JP)

(73) Assignee: Kaichiro Kamei, Mie (JP)

( * ) Notice: Subject to any disclaimer, the term of this patent is extended or adjusted under 35 U.S.C. 154(b) by 0 days.

(21) Appl. No.: 14/136,747

(22) Filed: Dec. 20, 2013

(65) Prior Publication Data

US 2014/0178130 A1   Jun. 26, 2014

(30) Foreign Application Priority Data

Dec. 21, 2012   (JP) .................................. 2012-279696

(51) Int. Cl.
*E02B 3/06* (2006.01)
*E02B 3/04* (2006.01)
*E02B 15/08* (2006.01)

(52) U.S. Cl.
CPC . *E02B 3/062* (2013.01); *E02B 3/04* (2013.01); *E02B 3/06* (2013.01); *E02B 15/0814* (2013.01)

(58) Field of Classification Search
USPC .................................... 405/21, 26, 27, 32, 63
See application file for complete search history.

(56) References Cited

U.S. PATENT DOCUMENTS 3,846,990 A * 11/1974 Bowley ............................ 405/26
4,130,994 A * 12/1978 Van Moss, Jr. .................. 405/24
5,294,211 A    3/1994 Niimura

FOREIGN PATENT DOCUMENTS

| JP | 39-23495 B | 10/1964 |
|---|---|---|
| JP | 50-113030 A | 9/1975 |
| JP | 63-019314 A | 1/1988 |
| JP | 04-289311 | 10/1992 |
| JP | 05-125708 A | 5/1993 |
| JP | 06-43025 A | 6/1994 |
| JP | 07-047990 A | 2/1995 |
| JP | 07-247528 A | 9/1995 |
| JP | 09-21122 A | 1/1997 |
| JP | 09-125338 A | 5/1997 |
| JP | 2000-008344 A | 1/2000 |
| JP | 2001-020249 A | 1/2001 |
| JP | 2001-295244 A | 10/2001 |
| JP | 2002-250020 A | 9/2002 |
| JP | 2003-293346 A | 10/2003 |
| JP | 2007-247250 A | 9/2007 |
| JP | 2008-265396 A | 11/2008 |
| JP | 2009-198207 A | 9/2009 |
| JP | 2012-090915 A | 5/2012 |
| JP | 2012-131332 A | 7/2012 |
| JP | 2013-014972 A | 1/2013 |

* cited by examiner

*Primary Examiner* — Benjamin Fiorello
*Assistant Examiner* — Kyle Armstrong
(74) *Attorney, Agent, or Firm* — Smith, Gambrell & Russell LLP.

(57) ABSTRACT

The inventive wave dissipating device includes a sea surface sheet to be installed along a sea surface, a sea submergence sheet to be installed below the sea surface sheet generally parallel to the sea surface sheet in sea, and connection ropes connecting the sheets to each other. The sea surface sheet has a predetermined area, and functions as a float to float on the sea surface in an installed state. The sea submergence sheet has the same area as the sea surface sheet When the sea surface sheet is likely to be moved by the tsunami, the sea submergence sheet functions as a weight to prevent the movement of the sea surface sheet, thereby dissipating the wave.

13 Claims, 4 Drawing Sheets

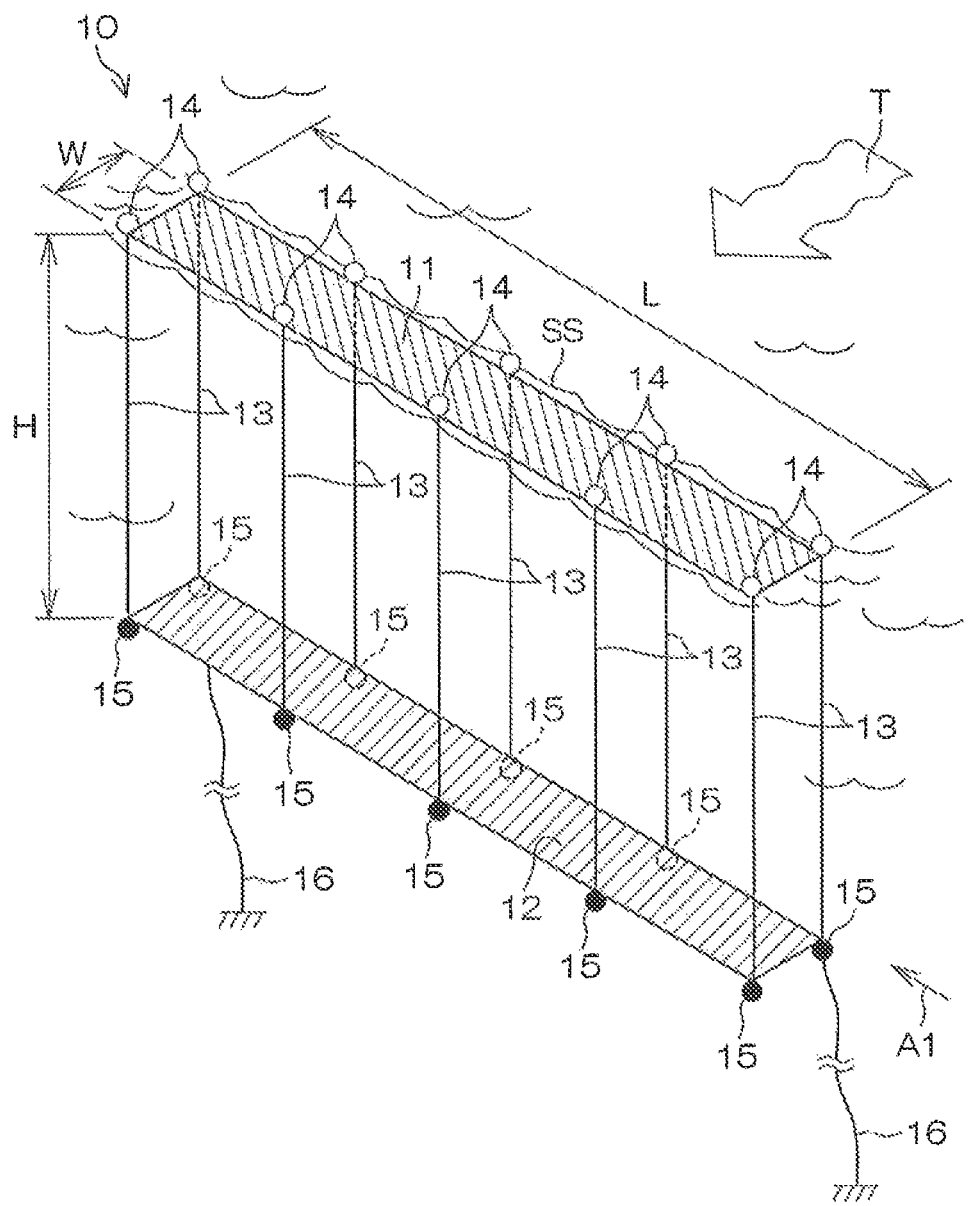

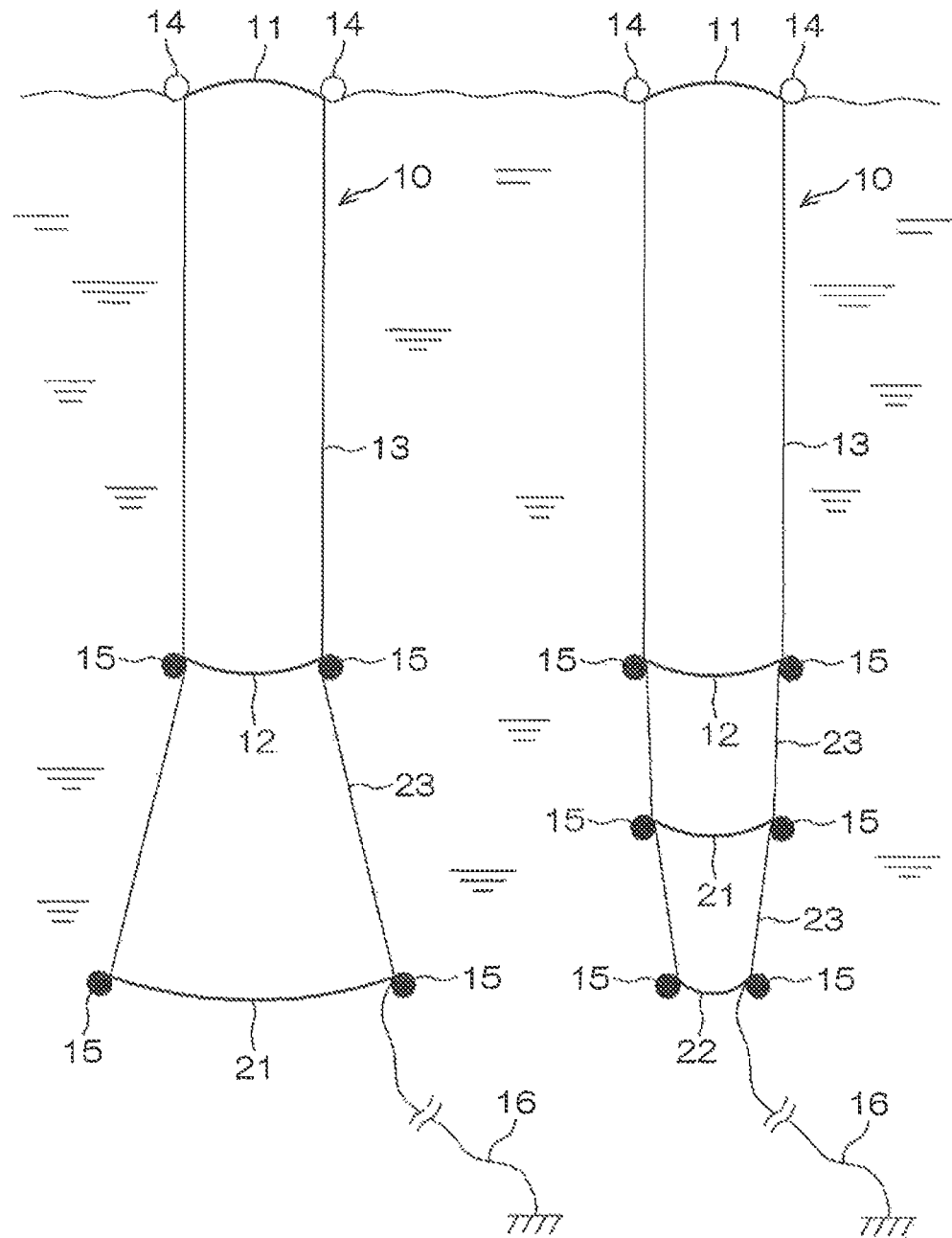

WAVE DISSIPATING DEVICE

BACKGROUND OF THE INVENTION

1. Field of the Invention

The present invention relates to a wave dissipating device for diminishing influences of tsunami caused by earthquake.

2. Description of Related Art

Tsunami can cause devastating human casualties and economic damages. To cope with this, various wave dissipating devices are conventionally proposed for diminishing influences of the tsunami.

Prior Art Documents

Patent Literature 1: JP-HEI6 (1994)-43025U
Patent Literature 2: JP-HEI7 (1995)-247528A
Patent Literature 3: JP-HEI9 (1997)-21122A
Patent Literature 4: JP-HEI9 (1997)-125338A
Patent Literature 5: JP-2008-265396A

SUMMARY OF THE INVENTION

The wave dissipating devices conventionally proposed each include a wave dissipating sheet or a wave dissipating member to be installed on the surface of sea, and ropes or the like each having opposite ends, one of which is connected to the wave dissipating sheet or member and the other of which is connected to the bottom of the sea or an anchor weight.

It is well known that the height, the magnitude and the energy level of tsunami are often out of expectation as taught by the Great East Japan Earthquake. When massive tsunami occurs, the wave dissipating sheet of such a conventional wave dissipating device fails to properly function, because a fixture provided at the bottom of the sea for connection to the wave dissipating sheet is broken or the weight is easily lifted by the energy of the tsunami.

In view of the foregoing, it is a principal object of the present invention to provide a wave dissipating device having a simplified construction and yet capable of reliably diminishing the energy of the tsunami.

According to the present invention, there is provided a wave dissipating device which includes a flexible sea surface sheet to be installed along a sea surface and having a predetermined area; a flexible sea submergence sheet to be installed below the sea surface sheet generally parallel to the sea surface sheet in sea and having a predetermined area; a first connection cable member which connects the sea surface sheet to the sea submergence sheet with at least peripheral edge portions of the sea surface sheet and the sea submergence sheet being spaced from each other in generally parallel relation; and a second connection cable member having opposite ends, one of which is connected to the sea submergence sheet and the other of which is fixed to a sea bottom to retain the sea submergence sheet at an installation position at which the sea submergence sheet is installed in the sea; wherein the sea surface sheet functions as a float to float on the sea surface in an installed state; wherein the area of the sea submergence sheet is equal to or greater than the area of the sea surface sheet.

The present invention is based on a phenomenon such that, as a wave advances, the sea surface abruptly rises but sea water below the sea surface is less liable to move up in the sea. With the aforementioned arrangement, a load acts on a lower surface of the sea surface sheet due to the movement of the sea water, so that the sea surface sheet is likely to be moved up as the sea surface rises. At this time, a load acts on an upper surface of the sea submergence sheet in a direction opposite from the direction of the load acting on the sea surface sheet, so that the sea submergence sheet functions as a resistance to the upward movement of the sea surface sheet.

Therefore, the sea surface sheet, the sea submergence sheet and the first and second connection cable members are each made of a material having a strength sufficient to provide the aforementioned function.

The sea surface sheet has, for example, an elongated rectangular shape having an area (size) defined by a length L of not less than 20 m and a width W of not less than 3 m. The area (size) of the sea submergence sheet may be equal to or greater than the area (size) of the sea surface sheet. For example, the sea submergence sheet has an elongated rectangular shape having a length L of not less than 20 m and a width W of not less than 3 m.

The wave dissipating device is installed so that sea swells (waves of tsunami) come in a direction crossing the lengths of the sheets (preferably perpendicular to the lengths of the sheets).

The movement of the sea water (the energy of the tsunami) raises sea surface water, and the sea surface sheet is likely to follow the movement of the sea surface water to be moved up together with the sea surface water (wave).

On the other hand, the sea water in the sea does not more as significantly as the sea surface water or moves with a delay after the movement of the sea surface water. Therefore, the sea submergence sheet is not moved up or, if any moved up with a delay after the movement of the sea surface sheet.

When the sea surface sheet is likely to be forced to move up by the movement of the sea water (wave), the pressure of the sea water is applied to the sea submergence sheet. Therefore, the sea submergence sheet functions as a weight for the sea surface sheet thus likely to move up. If a great upward force is applied to the sea surface sheet, the sea water applies a proportionally great pressure to the sea submergence sheet. As a result, the pressure of the sea water applied to the sea submergence sheet counteracts the energy of the wave forcing up the sea surface sheet to thereby diminish the movement of the sea water (wave).

The first connection cable member connecting the sea surface sheet to the sea submergence sheet has a length that is not less than an expected tsunami height, e.g., about 10 to about 50 m.

If the sea surface sheet is floatable on the sea surface due to the characteristic properties of the material for the sea surface sheet, there is no need to additionally attach a float to the sea surface sheet. If the sea surface sheet is made of a material which does not float on the sea surface, however, the sea surface sheet may be imparted with a float function by attaching a float to the sea surface sheet as required.

The sea surface sheet is not necessarily required to be a completely liquid-tight sheet (a sheet made of a material impermeable to liquid), but may be a sheet capable of permeating a predetermined amount of sea water when a higher pressure is applied thereto. Where the sea surface sheet is made of such a material, massive energy of the tsunami applied to the sea surface sheet can be properly attenuated and partly escaped through the sea surface sheet. This prevents the tearing of the sea surface sheet and the breakage of a connection portion connected to the first connection cable member.

Since the pressure is applied to the sea submergence sheet in a direction opposite to the direction of the pressure applied to the sea surface sheet, the sea submergence sheet is desirably made of the same material as the sea surface sheet. Where the material for the sea submergence sheet is floatable in water, a proper weight may be attached to the sea submergence sheet to retain the sea submergence sheet in the sea.

Alternatively, the sea submergence sheet may be made of a material that is different from the material for the sea surface sheet and can be retained in the sea.

The sea submergence sheet is not necessarily required to be one sheet but may be two or plural sheets having a structure such that a second sea submergence sheet is further installed below the sea submergence sheet.

According to the present invention, when sea surface water is abruptly and significantly moved due to tsunami to lift or move the sea surface sheet, the pressure acts on the sea submergence sheet in a direction opposite to the direction of the pressure applied to the sea surface sheet. Therefore, the sea submergence sheet functions as a resistance to the movement of the sea surface sheet. Thus, the sea submergence sheet prevents the movement of the sea surface sheet, thereby diminishing the movement of the wave, i.e., the abrupt movement of the sea water.

Thus, the wave dissipating device can be provided, which has a simplified construction and is practical and excellent in wave dissipating function.

BRIEF DESCRIPTION OF DRAWINGS

FIG. 1 is a perspective view schematically showing how a wave dissipating device according to one embodiment of the present invention is installed (placed).

FIGS. 3A and 3B are schematic diagrams showing a variant of the wave dissipating device 10.

DETAILED DESCRIPTION OF THE PREFERRED EMBODIMENTS

Figure 2A:
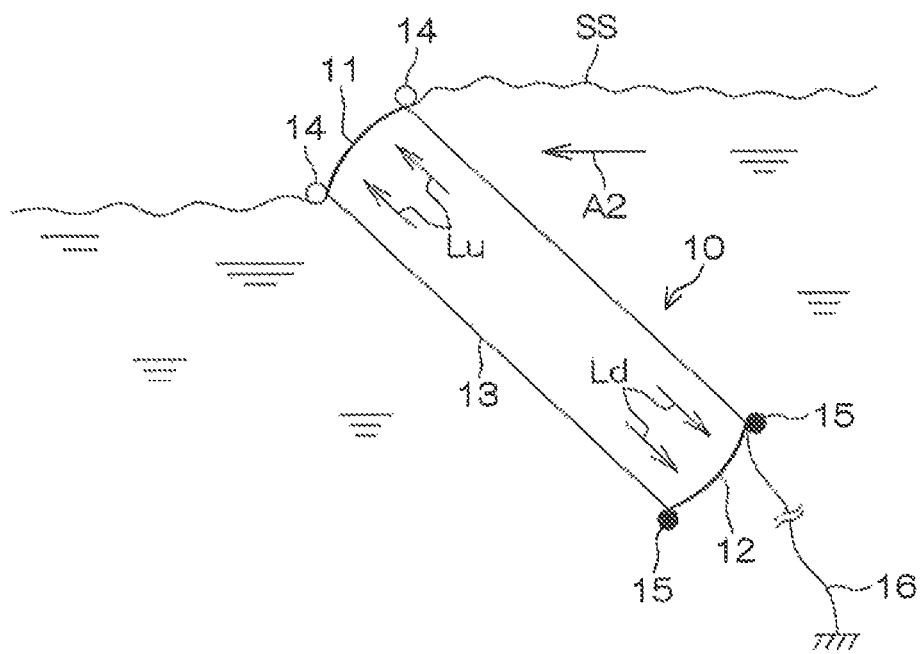
FIGS. 2A and 2B are schematic sectional views for explaining how the wave dissipating device functions with respect to tsunami, particularly, FIG. 2A showing how the wave dissipating device counteracts horizontal movement of sea water, FIG. 2B showing how the wave dissipating device counteracts vertical movement of sea water.

Referring to the attached drawings, a specific embodiment of the present invention will hereinafter be described.

FIG. 1 is a schematic perspective view showing how a wave dissipating device 10 according to the embodiment of the present invention is installed.

The wave dissipating device 10 includes a sea surface sheet 11, a sea submergence sheet 12, connection ropes 13 (first connection cable member) connecting the sea surface sheet 11 to the sea submergence sheet 12, float balls 14 attached to the sea surface sheet 11, weight balls 15 attached to the sea submergence sheet 11, and anchor ropes 16 (second connection cable member) each having opposite ends, one (upper one) of which is attached to the sea submergence sheet 12 and the other (lower one) of which is fixed to the bottom of the sea.

In this embodiment, the sea surface sheet 11 has an elongated rectangular shape having a length L of not less than 20 m and a width W of not less than 3 m. The sea surface sheet 11 is installed along the surface of the sea, for example, with its length L perpendicular to the advancing direction of tsunami T. The sea surface sheet 11 may be installed in a direction crossing the direction of waves of tsunami T or in a direction parallel to the direction of waves of tsunami T. When the sea surface sheet 11 is installed along the sea surface, the sea surface sheet 11 may be completely floated on the sea surface or may be slightly sunk below the sea surface. A woven fabric of a synthetic resin may be used as a material for the sea surface sheet 11. For example, a sheet material such as for a tent or a hot-air balloon or a reinforced sheet material imparted with a higher strength (tensile strength) by weaving carbon filaments into the tent or hot-air balloon sheet material may be used.

In this embodiment, the plurality of float balls 14 are attached to a peripheral edge portion of the sea surface sheet 11 in properly spaced relation by way of example. If the sea surface sheet 11 per se has a float function to float on the sea surface, however, the float balls 14 may be obviated.

The sea submergence sheet 12 is installed below the sea surface sheet 11 generally parallel to the sea surface sheet 11 in the sea. The sea submergence sheet 12 has an elongated rectangular shape having the same size as the sea surface sheet 11, for example, having a length L of not less than 20 m and a width W of not less than 3 m.

The sea submergence sheet 12 is not necessarily required to have the same size as the sea surface sheet 11, but may have a slightly greater size than the sea surface sheet 11 to function as the weight for the sea surface sheet 11.

A woven fabric of a synthetic resin or a reinforced woven fabric of the synthetic resin similar to the material for the sea surface sheet 11 may be used as the material for the sea submergence sheet 12. Alternatively, the sea submergence sheet 12 may be made of a rubber sheet reinforced with carbon fibers.

In this embodiment, the plurality of weight balls 15 are attached to a peripheral edge portion of the sea submergence sheet 12 in properly spaced relation so as to reliably constantly retain the sea submergence sheet 12 at a predetermined position in the sea by way of example. If the characteristic properties of the material for the sea submergence sheet 12 makes it possible to sink the sea submergence sheet 12 in the sea, the weight balls 15 may be obviated.

The connection ropes 13 may be, for example, braided ropes of a synthetic resin mainly containing a nylon. Alternatively, the connection ropes 13 may be metal wires or chains subjected to a salt water anti-corrosion treatment.

The length of the connection ropes 13, i.e., a vertical distance H between the sea surface sheet 11 and the sea submergence sheet 12, may be, for example, 10 to 50 m. Where a difference in height H between the sea surface sheet 11 and the sea submergence sheet 12 is not less than 10 m, which is not less than an expected height of tsunami and makes a difference between the movement of sea water (wave) on the sea surface and the movement of sea water in the sea, the sea submergence sheet 12 can function as the weight for the sea surface sheet 11. If the height difference H between the sea surface sheet 11 and the sea submergence sheet 12 is greater than 50 m, an excess load is applied to the sea submergence sheet 12, resulting in the tearing of the sea surface sheet 11 or the sea submergence sheet 12 or in the disconnection or the breakage of the connection ropes 13.

The anchor ropes 16 may be made of the same material as the connection ropes 13. Alternatively, chains may be used for the anchor ropes 16. The anchor ropes 16 each have an upper end fixed and connected to an end of the sea submergence sheet 12 and a lower end fixed to the bottom of the sea. Tensile forces to be applied to the anchor ropes 16 are merely required to prevent the sea submergence sheet 12 from flowing away due to moderate movement of the sea water in the sea, but not required to be strong enough to resist the pressure to be applied to the sea surface sheet 11. Therefore, anchors for ships may be respectively connected to the lower ends of the anchor ropes 16 to be sunk on the bottom of the sea.

Figure 2B:
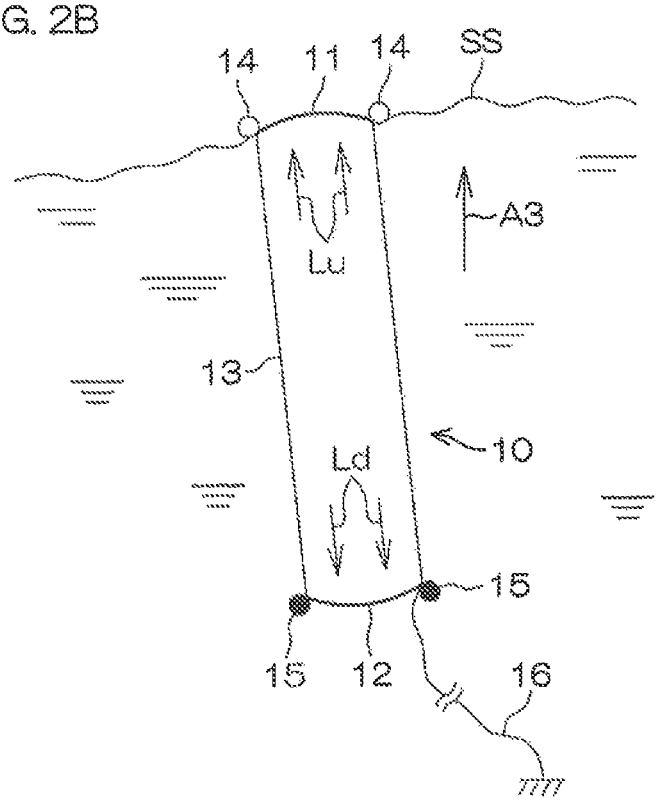

FIGS. 2A and 2B are schematic sectional views of the wave dissipating device 10 as seen in an arrow direction A1 in FIG. 1 for explaining how the wave dissipating device 10 counteracts the movement of the wave (the movement of water).

Where the wave moves horizontally (on the surface of the sea) as indicated by an arrow A2 in FIG. 2A, the sea surface SS is moved to apply a load Lu to a lower surface of the sea surface sheet 11. On the other hand, a counter load Ld with respect to the load Lu is applied to the sea submergence sheet 12 in the sea, because the sea water in the sea moves slowly or moves for a shorter distance. In other words, when the sea surface SS is moved horizontally, the sea surface sheet 11 is likely to follow the movement of the sea surface SS. However, the counter force is applied to the sea submergence sheet 12, so that the sea submergence sheet 12 functions as a weight for the sea surface sheet 11 to prevent the horizontal movement of the sea surface sheet 11.

Consequently, this dissipates or attenuates the wave occurring on the sea surface SS.

FIG. 2B is a schematic diagram showing how the wave dissipating device 10 counteracts the vertical movement (upward movement) of the sea surface SS.

Where the wave moves vertically (the sea surface is moved vertically) as indicated by an arrow direction A3, a load Lu is applied to the lower surface of the sea surface sheet 11 as in the case of the horizontal wave (horizontal movement of the sea surface). On the other hand, a counter load Ld is applied to an upper surface of the sea submergence sheet 12. Therefore, the sea submergence sheet 12 functions as a weight for the sea surface sheet 11, so that the sea surface sheet 11 cannot be moved up together with the movement of the wave to dissipate or attenuate the movement of the wave.

FIGS. 3A and 3B are schematic diagrams showing a variant of the wave dissipating device 10. As shown in FIGS. 3A and 3B, a second sea submergence sheet 21 or a third sea submergence sheet 22 may be further installed below the sea submergence sheet 12. In other words, the sea submergence sheet 12 may be plural sheets having a structure such that the sheets are installed in the perpendicular direction. In this case, as shown in FIG. 3A, the area of the second sea submergence sheet 21 may be greater than the area of the sea submergence sheet 12. Or, as shown in FIG. 3B, each area of the second sea submergence sheet 21 and the third sea submergence sheet 22 may be smaller than the area of the sea submergence sheet 12.

In FIGS. 3A and 3B, a reference numeral 23 shows a connection rope as a third connection cable member, and a length of the connection rope is shorter than a length of the connection rope 13.

Figure 4:
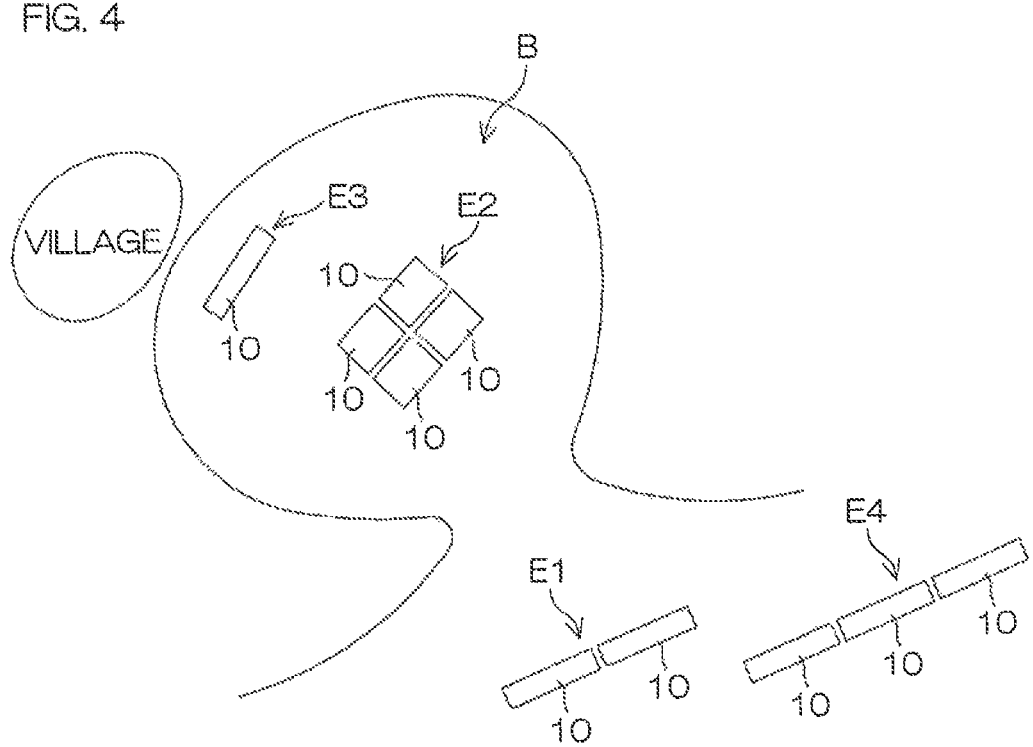
FIG. 4 is a schematic diagram for explaining how inventive wave dissipating devices are installed in and around a bay.

FIG. 4 is a schematic diagram for explaining how wave dissipating devices 10 are installed in and around a bay B by way of example.

Wave dissipating devices 10 are preferably installed outside the entrance of the bay B so as not to prevent the sailing of ships (as indicated by a reference character E1). A plurality of wave dissipating devices 10 may be longitudinally connected together according to the width of the entrance of the hay B for installation.

Wave dissipating devices 10 may be installed in a center portion of the bay B (as indicated by a reference character E2). In the center portion of the bay B, waves reflected on the coast gather together and, therefore, the wave dissipating devices 10 can advantageously dissipate the reflected waves. The sea surface sheets and the sea submergence sheets of the wave dissipating devices 10 to be installed in the center portion of the bay B preferably each have a square shape or a round shape as seen in plan so that the wave dissipating devices 10 can receive the waves in any directions therearound to dissipate the waves.

A wave dissipating device 10 may be installed in a region of the bay B adjacent to a seaside village (as indicated by a reference character E3).

Further, a plurality of wave dissipating devices 10 may be installed offshore outside the bay B as extending a relatively long distance (as indicated by a reference character E4).

The present invention is not limited to the embodiment described above. The inventive wave dissipating device may be installed in a river or a lake rather than in the sea. In this case, the inventive wave dissipating device is capable of dissipating big waves occurring in the river or the lake due to a strong wind or an earthquake.

It should be understood that various modifications may be made within the scope of the present invention defined by the appended claims.

This application corresponds to Japanese Patent Application No. 2012-279696 filed in the Japan Patent Office on Dec. 21, 2012, the disclosure of which is incorporated herein by reference in its entirety.

What is claimed is:

1. A wave dissipating device comprising:
   a flexible sea surface sheet to be installed along a sea surface and having a predetermined area defined by peripheral edge portions thereof;
   a flexible sea submergence sheet to be installed below the sea surface sheet generally parallel to the sea surface sheet in the sea and having a predetermined area defined by peripheral edge portions thereof;
   a plurality of first connection cable members, the first connection cable members surrounding the area of the sea surface sheet and the area of the sea submergence sheet and connecting the peripheral edge portions of the sea surface sheet to the peripheral edge portions of the sea submergence sheet whereby at least the peripheral edge portions of the sea surface sheet and the peripheral edge portions of the sea submergence sheet are spaced from each other in generally parallel relation; and
   a second connection cable member having opposite ends, one of which is connected to the sea submergence sheet and the other of which is fixed to a sea bottom to retain the sea submergence sheet at an installation position at which the sea submergence sheet is installed in the sea;
   wherein the sea surface sheet functions as a float to float on the sea surface in an installed state;
   wherein the area of the sea submergence sheet is equal to or greater than the area of the sea surface sheet, and
   at least one of the sea surface sheet and the sea submergence sheet consists essentially of a woven fabric of a synthetic resin.

2. The wave dissipating device according to claim 1, further comprising:
   a flexible second sea submergence sheet to be installed below the sea submergence sheet generally parallel to the sea submergence sheet in the sea and having a predetermined area; and
   a third connection cable member which connects the sea submergence sheet to the second sea submergence sheet with at least peripheral edge portions of the sea submergence sheet and the second sea submergence sheet being spaced from each other in generally parallel relation,
   wherein one end of the second connection cable member is connected to the second sea submergence sheet.

3. The wave dissipating device according to claim 2, wherein the area of the second sea submergence sheet is greater than the area of the sea submergence sheet.

4. The wave dissipating device according to claim 2, wherein the area of the second sea submergence sheet is smaller than the area of the sea submergence sheet.

5. A wave dissipating device comprising:
- a flexible water surface sheet to be installed along a water surface and having a predetermined area;
- a flexible water submergence sheet to be installed below the water surface sheet generally parallel to the water surface sheet in water and having a predetermined area;
- a plurality of first connection cable members, the first connection cable members surrounding the area of the water surface sheet and the area of the water submergence sheet and connecting the peripheral edge portions of the water surface sheet to the peripheral edge portions of the water submergence sheet whereby at least the peripheral edge portions of the water surface sheet and the peripheral edge portions of the water submergence sheet are spaced from each other in generally parallel relation; and
- a second connection cable member having opposite ends, one of which is connected to the water submergence sheet and the other of which is fixed to a water bottom to retain the water submergence sheet at an installation position at which the water submergence sheet is installed in the water;
- wherein the water surface sheet functions as a float to float on the water surface in an installed state;
- wherein the area of the water submergence sheet is equal to or greater than the area of the water surface sheet, and
- at least one of the sea surface sheet and the sea submergence sheet consists essentially of a woven fabric of a synthetic resin.

6. The wave dissipating device according to claim 1, wherein both the sea surface sheet and the sea submergence sheet consist essentially of a woven fabric of a synthetic resin.

7. The wave dissipating device according to claim 1, wherein both the sea surface sheet and the sea submergence sheet include carbon filaments.

8. The wave dissipating device according to claim 1, wherein
- the sea surface sheet consists essentially of woven fabric of synthetic resin, and
- the sea submergence sheet consists essentially of rubber including carbon fibers.

9. The wave dissipating device according to claim 1, wherein the first connection cable members space the sea surface sheet and the sea submergence sheet no more than 50 meters from each other.

10. The wave dissipating device according to claim 5, wherein both the sea surface sheet and the sea submergence sheet consist essentially of a woven fabric of a synthetic resin.

11. The wave dissipating device according to claim 5, wherein both the sea surface sheet and the sea submergence sheet include carbon filaments.

12. The wave dissipating device according to claim 5, wherein
- the sea surface sheet consists essentially of woven fabric of synthetic resin, and
- the sea submergence sheet consists essentially of rubber including carbon fibers.

13. The wave dissipating device according to claim 5, wherein the first connection cable members space the sea surface sheet and the sea submergence sheet no more than 50 meters from each other.

* * * * *